United States Patent [19]

Cicognani

[11] 4,126,053
[45] Nov. 21, 1978

[54] V-BELT

[75] Inventor: Mario Cicognani, Milan, Italy

[73] Assignee: Industrie Pirelli S.p.A., Milan, Italy

[21] Appl. No.: 790,809

[22] Filed: Apr. 25, 1977

[30] Foreign Application Priority Data

May 7, 1976 [IT] Italy .............................. 23047 A/76

[51] Int. Cl.$^2$ .......................... F16G 1/00; F16G 5/00
[52] U.S. Cl. ..................................... 74/231 P; 74/234
[58] Field of Search ..................... 74/231 P, 233, 234; 156/137

[56] References Cited

U.S. PATENT DOCUMENTS 3,987,684  10/1976  Fisher et al. ............................ 74/233
4,031,768   6/1977  Henderson et al. .................... 74/233

Primary Examiner—Leonard H. Gerin
Attorney, Agent, or Firm—Stevens, Davis, Miller & Mosher

[57] ABSTRACT

A power transmission belt has an elastomeric body which is frusto-triangularly shaped in cross-section. Such power transmission belts are commonly referred to as V-shaped belts. The belt provided by the invention has a plurality of laterally spaced cords which are parallel to each other and are arranged longitudinally throughout the length of the belt. At least those portions of the sides or flanks of the belt which bear against the walls of grooves of a pulley wheel when the belt is rotated are covered with an elastomeric composition having cut lengths of fibrous material embedded therein and disposed so the longitudinal axes of the fibers are substantially perpendicular to the longitudinal plane of symmetry of the belt. The fibers may be impregnated with an organic polyisocyanate solution.

4 Claims, 4 Drawing Figures

V-BELT

The present invention relates to V-shaped transmission belts formed of an elastomeric composition.

The V-shaped power transmission belts are belts whose section perpendicular to their axis has the form of an isosceles trapezium and these belts are used in the formation of a transmission with grooved pulleys where the grooves or races of the pulleys have V-shaped sections. The V-belts have a body of elastomeric material into which is embedded a traction resistent insert, formed by a plurality of small cords, coplanar and parallel one to the other, disposed parallel to the belt axis. The axes of the small cords lie on the neutral plane of the belt itself, that is, on the ideal plane which separates the compression zone of the belt when the latter passes onto the pulleys from the traction zone.

A covering layer may be provided around the body of the belt. The covering layer may be a rubberized woven fabric or a covering made of a flocculation of randomly distributed fibers, that is, without any preferential orientation, over the belt surface and absorbed into the surface of the elastomeric material of the belt itself.

In the known V-shaped belts, the purpose of the covering layer is to increase the resistance of the belt against the wear and tear of the belt itself and especially to increase the resistance against the wear and tear of the flanks, since it is just on the belt flanks that most of the wear down takes place. As a matter of fact, the contact between a V-belt and the pulley grooves takes place between the belt sides and the lateral walls of the grooves or races of the pulley.

Regarding the material used for manufacturing the transmission belts, and hence, including also the V-shaped belts, considerable progress has taken place, both as regards the composition of the elastomeric material as well as the textile fabric or the like, used to form the covering layer of the belts and the small cords which constitute the traction resistent insert.

The materials presently used for manufacturing belts have high mechanical resistance and it is possible to manufacture V-belts capable of transmitting high power from them because the materials used have the mechanical characteristics for permitting it.

The known V-belts for transmitting high mechanical power are, however, oversized in the sense that it is necessary to manufacture transmission V-belts having sections with an area greater than actually needed for the mechanical resistance of the material, because otherwise, deformation occurs in the belt body with the consequent slipping of the belt in the pulley grooves.

An object of the present invention is to provide a V-belt capable of transmitting considerably higher power than that transmitted by belts of the known type having an identical section; or in other words, a V-belt having a considerably smaller section with respect to belts of the known type which have an equal transmission power.

Thus, another object of the present invention is to reduce the cost of V-belts with respect to the V-belts of the known type which have an equal transmission power.

The objects of the present invention are accomplished by providing a V-belt having a body made from an elastomeric composition comprising a traction resistent insert formed by a plurality of small cords coplanar and parallel one to the other and extending in the direction of the larger dimension of the belt and a covering for the belt surface characterized by the fact that the covering, at least in the areas of the belt flanks and on these at least in the zones corresponding to that portion of the belt body which works under compression, is constituted by at least one layer of elastomeric material having fibers embedded therein which are perpendicular to the longitudinal plane of symmetry of the belt.

The present invention will be better understood from the following detailed description, by way of non-limitative example, and with reference made to the attached drawing wherein.

The general idea of the invention is to provide a V-belt having a covering which, at least on its own flanks, is composed of a layer of elastomeric material containing a plurality of fibers orientated in such a way as to be perpendicular to the longitudinal plane of symmetry of the belt itself.

Moreover, still according to the general idea of the invention, the fibers of the covering layer of the belt flanks are treated either before or after the covering layer has been applied onto the belt body, with a polyisocyanate solution of the type which will be described hereinafter so as to increase the rigidity of the fibers.

A convenient polyisocyanate solution for treating the fibers even though it is not intended in a restrictive sense, is an anhydrous toluol solution of an organic polyisocyanate such as triphenyl-methane triisocyanate, or the thiono-phosphoric ester of tris (p-phenyl-isocyanate), where the organic polyisocyanate percentage is comprised between 10% and 20% in weight of the solution. Other solvents usable for the organic polyisocyanate solution can be the methyl chloride, the ethyl acetate and the trichloroethylene, where said solvents are completely anhydrous.

From the description of the general purpose of the invention stated above, different embodiments of V-belts according to the present invention are apparent.

Figure 1:
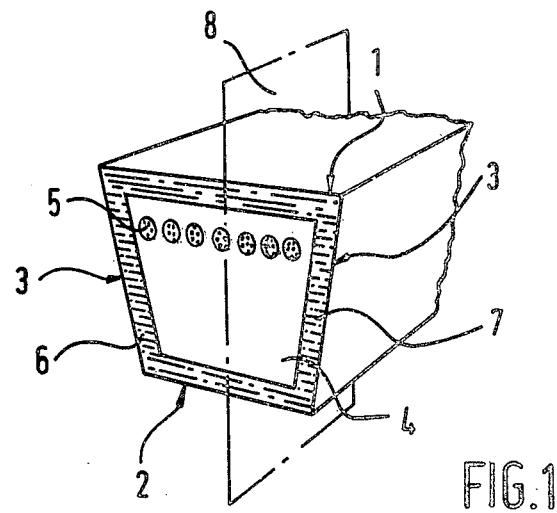
FIG. 1 illustrates in a perspective view a length of one embodiment of the V-belt of the invention.

In the drawing, one embodiment is illustrated in FIG. 1. As can be seen in FIG. 1 the illustrated V-belt has a cross-section in the form of an isosceles trapezium having a larger base 1, a smaller base 2 and two flanks or sides 3. The belt has a body 4 made from an elastomeric composition of the type known per se to a technician of the art for use in the formation of V-belts, as for example the one having the composition reported further on from which the presence of the flocked textile fibers has to be cancelled. A traction resistent insert formed by a plurality of small cords 5 is embedded in the belt. The cords 5 are coplanar and parallel to one another and extend longitudinally through the belt with the axes of the small cords lying in the neutral plane of the belt.

One layer 6 of elastomeric material having orientated fibers 7 embedded therein is disposed about the body 4.

The fibers 7 are all orientated in the areas of the belt flanks 3 in such a way as to extend perpendicular to the longitudinal plane of symmetry of the belt represented in FIG. 1 by a dot-and-dash line marked with reference numeral 8. The fibers 7 are also impregnated with a toluol solution of triphenyl-methane triisocyanate described above.

Figure 2:
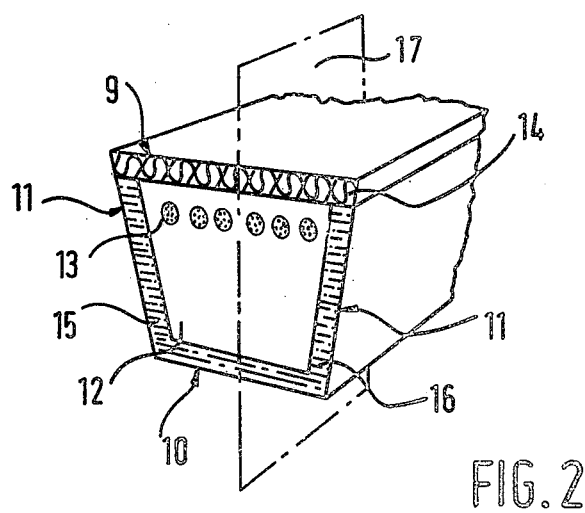
FIG. 2 illustrates in a perspective view a length of another embodiment of the V-belt of the invention.

A second embodiment of the V-belt of the invention is shown in FIG. 2.

As can be seen in FIG. 2 the V-belt has a cross-section in the form of an isosceles trapezium having a larger base 9, a smaller base 10 and two flanks 11. The belt has a body 12 made from an elastomeric composition conventionally used for making V-belts. A traction resistent insert formed by a plurality of small cords 13 is embedded in the belt. The cords are coplanar and parallel one to the other and are disposed along the larger dimension (length) of the belt and with the axes of the small cords lying on the neutral plane of the belt.

A covering constituted by at least one layer of woven fabric 14 is disposed over the larger base of the belt and one layer 15 of an elastomeric material having fibers 16 embedded therein is placed over the flanks and the smaller base of the belt.

The fibers 16 of the covering for flanks 11 are all orientated perpendicularly to the longitudinal plane of the belt. The longitudinal plane is shown in FIG. 2 with a dot-and-dash line marked with the reference number 17. Fibers 16 are impregnated with the polyisocyanate solution described above and even the fabric 14 may be impregnated with the same polyisocyanate solution.

Figure 3:
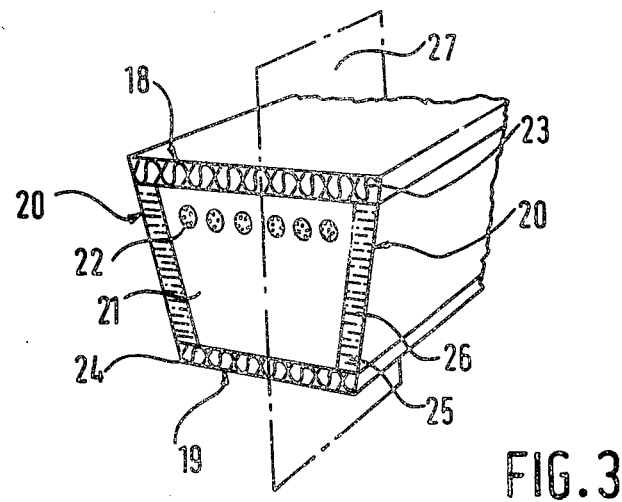
FIG. 3 illustrates in a perspective view a length of another embodiment of the V-belt of the invention.

FIG. 3 represents another embodiment of the V-belt of the invention.

As can be seen in FIG. 3, the V-belt has a cross-section in the form of an isosceles trapezium with a larger base 18, a smaller base 19 and two flanks 20.

The belt has a body 21 made of a conventional elastomeric composition. Inside the body a traction resistent insert formed by a plurality of small cords 22 is embedded. The cords are parallel and coplanar one to the other and are disposed according to the greater dimension of the belt and with the axes lying in the neutral plane of the belt.

On the larger base 18 of the belt, there is a covering layer constituted by at least one layer of rubberized woven fabric 23, while on the smaller base 19 of the belt, there is a covering constituted by at least one layer of rubberized woven fabric 24.

Each of the flanks 20 of the belt in the zone which is in contact with the pulley grooves is covered with a layer 25 of elastomeric material having fibers 26 embedded therein. The fibers 26 are orientated perpendicular to the longitudinal plane of symmetry of the belt which is represented in FIG. 3 with a dot-and-dash line marked with the reference numeral 27.

The fibers 26 and the fabrics 23 and 24 are impregnated with the polyisocyanate solution described above.

Figure 4:
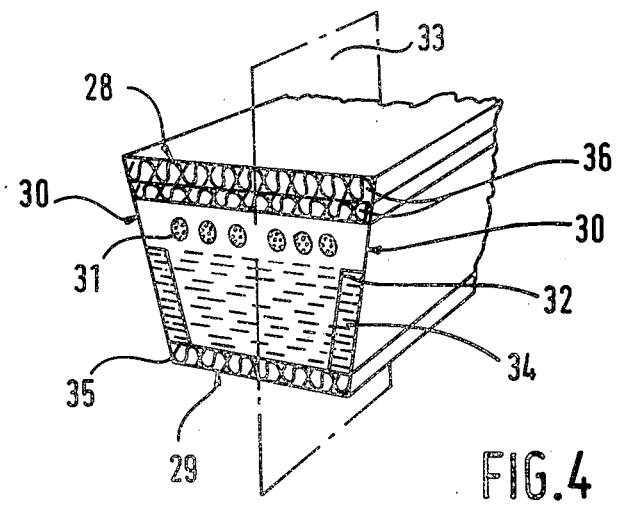
FIG. 4 illustrates in a perspective view a length of still another embodiment of the V-belt of the invention.

FIG. 4 represents a V-belt forming still another embodiment of the invention.

As can be seen in this figure, the V-belt has a cross-section in the form of an isosceles trapezium in which can be distinguished a larger base 28, a smaller base 29 and two flanks 30. The belt has a body with a traction resistent insert embedded therein. The insert is formed by a plurality of small cords 31, each coplanar and parallel one to the other, disposed along the greater dimension of the belt and with the axes lying in the neutral plane of the belt itself.

The body of the belt lying in the position between the resistent insert and the smaller base 29 is composed of an elastomeric composition of the type known per se to a technician of the art, as for example the elastomeric composition is the following:

| | | |
|---|---|---|
| Chloroprene GRT type | 100 | parts by weight |
| Zinc oxide | 5 | parts by weight |
| Magnesium oxide | 4 | parts by weight |
| T B T U | 2 | parts by weight |
| Stearic acid | 0.750 | parts by weight |
| Antioxidizer | 1.500 | parts by weight |
| Aromatic oil | 5 | parts by weight |
| Carbon black FEF | 50 | parts by weight |
| Flocked textile fiber | 25 | parts by weight |

Fibers 32 are embedded in the body and are orientated in such a way as to be perpendicular to the longitudinal plane of symmetry of the belt. The longitudinal plane of symmetry is represented with dot-and-dash lines and marked with the reference numeral 33. A layer 34 of elastomeric material with fibers 32 treated with the toluol solution of triphenyl-methane triisocyanate described above covers the belt flanks 30 and layer 34 constitutes a covering for the belt flanks only in the belt zone which works under compression. Moreover, the smaller base 29 of the belt has a covering formed by a rubberized fabric 35 and the larger base 28 of the belt has a covering constituted by two superimposed layers of rubberized fabrics 36. In the embodiment of FIG. 4, the fabrics 35 and 36 of the covering of the bases are impregnated with the polyisocyanate solutions described above.

A belt according to the present invention based on the embodiment of FIG. 4 is particularly convenient because machines already in use for fabricating V-belts can be used to make it without modifications.

In making the belt, a belt sleeve is first formed, in a way known per se, consisting of a cylindrical body having an equal circumferential development to that of the belts to be produced, superimposing the belt components on a mandrel of the known type.

The belt sleeve is formed by superimposing several layers which, beginning with the layer corresponding to the internal cylindrical surface of the sleeve, are at least one layer of woven fabric; a layer of elastomeric material with a plurality of fibers embedded therein, all orientated parallel to the generatrices of the cylindrical body of the sleeve; a helical winding of small cord fibers made of either organic or non-organic material or of metallic wires; a layer of elastomeric material; and two layers of woven fabric.

The sleeve is cut into rings and each ring, either during or after being cut, is shaped by giving the cross-section perpendicular to its axis the form of an isosceles trapezium. The shaped rings are cured in a way known per se to technicians of the field, so as to form V-belts.

Following the curing process, the belts are immersed in a solution of polyisocyanate such as the one previously described.

With this immersion process, the fabrics on the larger and smaller bases of the V-belts are impregnated with the polyisocyanate solution; and so also are the fibers which are embedded in the elastomeric material over the belt flanks originating in the layers 34 indicated in the embodiment represented in FIG. 4.

Tests have been carried out on belts according to the invention and tests have also been carried out on V-belts of the known type, i.e. on belts having the cross section of the form of an isosceles trapezium so as to compare the properties thereof.

In particular, two series of tests have been carried out precisely as follows:

(a) A series of tests have been carried out on belts, according to the invention, in the form of the embodiment represented in FIG. 4 and on belts of the type known, both having the same geometrical dimensions but submitting each type of belt to the maximum power transmissible.

(b) The other series of tests have been carried out on belts according to the invention in the form of the embodiment represented in FIG. 4 and on belts of the known type, so as to submit both types of belts to the same maximum power transmissible. For this purpose the belts according to the invention which were submitted to the tests all had cross-sections smaller than those of the belts of the known types.

All the tests were carried out according to the STANDARD SAE J 636 b. The belts submitted to the tests of point (a) had the following characteristics:

|  | Belts According to the Invention | Belts of the Known Type |
|---|---|---|
| Section: larger base mm | 10 | 10 |
| thickness mm | 8 | 8 |
| Length of the original mm | 900 | 900 |
| Traction resistent insertion | polyester | polyester |
| Layer of fabric placed over the larger base | n.2 layers of cotton fabric | n.2 layers cotton fabric |
| Layer of fabric placed over the smaller base | n.1 layer of cotton fabric | n.1 layer cotton fabric |
| Fibers embedded in belt body | cotton fibers to the extent of 15% | cotton fibers to the extent of 15% |
| Elastomeric material used for the belt body | neoprene | neoprene |
| Treatment with the isocyanate solution described above | Yes | No |

The results of the tests carried out are given in the table below:

|  | Belts According to the Invention | Belts of the Known Type |
|---|---|---|
| Power applied (HP) | 12 | 9 |
| Average life-span (hours) | 165 - 190 - 210 | 180 - 190 - 230 |

The belts subjected to the tests of point (b) had the same characteristics as those of point (a) but with the following exceptions:

|  | Belts According to The Invention | Belts of The Known Type |
|---|---|---|
| Section: larger base mm | 10 | 10 |
| thickness mm | 6 | 6 |

The results of the tests carried out are given in the table below:

|  | Belts According to the Invention | Belts of the Known Type |
|---|---|---|
| Power applied (HP) | 9 | 9 |
| Average life-span (hours) | 260 - 290 - 310 | 180 - 190 - 230 |

As can be seen the results of the tests demonstrate unequivocally that the objects of the present invention were obtained.

The reason why the belts of the invention are better than those of the prior art is not explainable from presently available information. Probably, the high values of the power transmitted (test (a)) for the belts according to the invention is due to the fact that the presence of a layer or covering of fibers over the flanks which are orientated perpendicular to the longitudinal plane of symmetry of the belt confers to the body of the latter a high dimensional stability of the belt body. It happens that the pressure contact existing between the belt flanks and the flanks of the pulley grooves is maintained even when under the high belt stresses which take place when high power must be transmitted.

This explanation seems to be confirmed by the test results obtained from point (b). The surface of the belt flanks, according to the invention, being of a smaller area with respect to that of the belts of the known type and with both of the belt types transmitting the same power, necessarily, the belt flanks, according to the invention, are more stressed than the flanks of the belts of the known type. Since the results of the tests carried out indicate that both types of belts have the same life-span, it follows necessarily, that the belt flanks according to the invention, have a considerably higher dimensional stability than those of belts of the known type.

Although the invention is described in detail for the purpose of illustration, it is to be understood that such detail is solely for that purpose and that variations can be made therein by those skilled in the art without departing from the spirit and scope of the invention except as it may be limited by the claims. In particular, within the scope of the present invention must be included all other belts derived from V-belts as, for example, the belts commonly known as "Poly-V" formed by several V-belts parallel to each other and united permanently all together through their larger bases.

What is claimed is:

1. A V-belt having a body made from an elastomeric material and comprising a traction resistant insert formed by a plurality of small cords coplanar and parallel one to the other, which extends in the direction of the larger dimension of the belt and a covering for the belt surface, said covering, at least in the zones of the belt flanks, corresponding to that position of the belt body which works under compression and being constituted by at least one layer of elastomeric material having fibers embedded therein, which fibers are disposed perpendicular to the longitudinal plane of symmetry of the belt itself, characterized by the fact that the fibers embedded in the elastomeric material covering the belt body are treated with a polyisocyanate solution.

2. The V-belt of claim 1 wherein the polyisocyanate solution is a toluol solution of triphenyl-methane triisocyanate.

3. An elastomeric endless power transmission belt having a substantially frusto-triangularly shaped cross-section and comprising (1) a traction resistant insert member comprising a plurality of cords extending in the direction of the largest dimension of the belt and disposed in the belt coplanar and parallel to each other, and (2) a covering on at least the surfaces of the belt in the areas which are under compression when the belt is transmitting power, said covering comprising a layer of elastomeric material having fibers which have been treated with a polyisocyanate dispersed therein and arranged substantially perpendicularly to the longitudinal plane of symmetry of the belt.

4. A power transmission belt having an elastomeric body which is frusto-triangular shaped in cross-section having a base adapted to be disposed in a groove of a pulley wheel and an opposite larger side, and sloping sidewalls having surfaces which ride on walls of the groove when the pulley wheel rotates, laterally spaced cords extending longitudinally through the belt embedded in the body near said larger base, said surfaces being covered with an elastomeric composition having fibers embedded therein with the length of the fibers perpendicular to the longitudinal plane of symmetry of the belt body, said fibers having been treated with an organic polyisocyanate.

* * * * *